(12) United States Patent
Chen et al.

(10) Patent No.: US 10,635,505 B2
(45) Date of Patent: Apr. 28, 2020

(54) AUTOMATED BATCH APPLICATION PROGRAMMING INTERFACES

(71) Applicant: COURSERA, INC., Mountain View, CA (US)

(72) Inventors: Shuang Chen, San Jose, CA (US); Yifan Mai, Mountain View, CA (US)

(73) Assignee: COURSERA, INC., Mountain View, CA (US)

( * ) Notice: Subject to any disclaimer, the term of this patent is extended or adjusted under 35 U.S.C. 154(b) by 0 days.

(21) Appl. No.: 14/755,035

(22) Filed: Jun. 30, 2015

(65) Prior Publication Data
US 2017/0004020 A1    Jan. 5, 2017

(51) Int. Cl.
*G06F 9/54* (2006.01)

(52) U.S. Cl.
CPC ............... *G06F 9/541* (2013.01); *G06F 9/54* (2013.01)

(58) Field of Classification Search
CPC .................................. G06F 9/541; G06F 9/54
USPC .......................................................... 719/328
See application file for complete search history.

(56) References Cited

U.S. PATENT DOCUMENTS

| | | | | |
|---|---|---|---|---|
| 5,883,946 A | * | 3/1999 | Beck ................... | H04M 3/4228 379/201.12 |
| 2006/0123102 A1 | * | 6/2006 | Vo ..................... | H04L 29/12066 709/223 |
| 2009/0187410 A1 | * | 7/2009 | Wilpon ................ | G10L 15/22 704/270.1 |
| 2012/0066586 A1 | * | 3/2012 | Shemesh ........... | G06F 17/30902 715/235 |
| 2013/0219409 A1 | * | 8/2013 | Woley .................... | G06F 9/542 719/313 |
| 2013/0227219 A1 | * | 8/2013 | Ueki ................... | G06F 12/0804 711/118 |
| 2014/0101278 A1 | * | 4/2014 | Raman ................... | G06F 9/528 709/213 |
| 2016/0216892 A1 | * | 7/2016 | Ngo ........................ | G06F 3/061 |

OTHER PUBLICATIONS

Web API Batching; Microsoft asp.net; http://aspnetwebstack.codeplex.com/wikipage?title=Web%20API%20Request%20Batching; 12 pages; last updated May 13, 2013.*

(Continued)

*Primary Examiner* — Brian W Wathen
*Assistant Examiner* — Kimberly L Jordan
(74) *Attorney, Agent, or Firm* — Brake Hughes Bellermann LLP

(57) ABSTRACT

In one general aspect, a method for rendering a web page can include receiving, from an interactive web application executing on a computing device, a plurality of application programming interface (API) calls for information and data for including in the rendering of the web page by the interactive web application, determining, for each of the plurality of API calls, whether an API call satisfies at least one criterion, storing, in a memory included on a computing device, an API call for inclusion in a batch of API calls if the API call satisfies the at least one criterion, and sending, in a single API call, the batch of API calls stored in the memory, the sending based on an occurrence of an event in the computing device.

20 Claims, 6 Drawing Sheets

(56) References Cited

OTHER PUBLICATIONS

"Ajax (programming)", Wikipedia The Free Encyclopedia, (https://en.wikipedia.org/wiki/Ajax_(programming)), printed Jun. 16, 2015, 6 pages.
"Application programming interface", Wikipedia The Free Encyclopedia, (https://en.wikipedia.org/wiki/Application_programming_interface), printed Jun. 16, 2015, 13 pages.
"The JavaScript Event Loop: Explained", Notes From Erin Swenson-Healey Blog, (http://blog.carbonfive.com/author/erin/), printed Jun. 19, 2015, 17 pages.

* cited by examiner

AUTOMATED BATCH APPLICATION PROGRAMMING INTERFACES

TECHNICAL FIELD

This description generally relates to interactive websites and an application programming interface (API) used by an interactive website.

BACKGROUND

A user on a client computing device can navigate to a website that can incorporate many ways for the user to interact with information and content provided by the website. For example, a user can navigate to an interactive website that allows a user, by way of a graphical user interface provided by the website on the client computing device, to enter data, select items, and respond to many other types of requests from the website in a synchronous or, in many cases, an asynchronous manner. The user's experience with the interactive website may be slow because of the many interactive calls the client computing device makes to one or more backend servers to obtain the necessary information needed to respond to the requests made by the website.

Thus, a need exists for systems, methods, and apparatus to address the shortfalls of present technology and to provide other new and innovative features.

SUMMARY

In one general aspect, a method for rendering a web page can include receiving, from an interactive web application executing on a computing device, a plurality of application programming interface (API) calls for information and data for including in the rendering of the web page by the interactive web application, determining, for each of the plurality of API calls, whether an API call satisfies at least one criterion, storing, in a memory included on a computing device, an API call for inclusion in a batch of API calls if the API call satisfies the at least one criterion, and sending, in a single API call, the batch of API calls stored in the memory, the sending based on an occurrence of an event in the computing device.

Example implementations may include one or more of the following features. For instance, the method can further include receiving a skeleton of the web page before receiving the API call. Determining, for each of the plurality of API calls, whether an API call satisfies at least one criterion can include determining that the API call occurs between a first tick and a second tick of an event loop executing on the computing device. The event can be the second tick of the event loop. The event can be the determining that a number of API calls stored in the memory equals a threshold number of API calls. Determining that an API call satisfies at least one criterion can include determining that a flag associated with an API call is set. The flag can be set based on the API call being performed within a predefined amount of time. The flag can be set based on the API call using less than a predetermined number of resources. The sending of the single API call can be performed in the background.

In another general aspect, a non-transitory, machine-readable medium having instructions stored thereon. The instructions, when executed by a processor, can cause a computing device to receive, from an interactive web application executing on a computing device, a plurality of application programming interface (API) calls for information and data for including in a rendering of a web page by the interactive web application, determine, for each of the plurality of API calls, whether an API call satisfies at least one criterion, store, in a memory included on a computing device, an API call for inclusion in a batch of API calls if the API call satisfies the at least one criterion, and send, in a single API call, the batch of API calls stored in the memory, the sending based on an occurrence of an event in the computing device.

Example implementations may include one or more of the following features. For instance, the instructions can cause the computing device to receive a skeleton of the web page before receiving the API call. Determining, for each of the plurality of API calls, whether an API call satisfies at least one criterion can include determining that the API call occurs between a first tick and a second tick of an event loop executing on the computing device. The event can be the second tick of the event loop. The event can be determining that a number of API calls stored in the memory equals a threshold number of API calls. Determining that an API call satisfies the at least one criterion can include determining that a flag associated with an API call is set. The flag can be set based on the API call being performed within a predefined amount of time. The flag can be set based on the API call using less than a predetermined number of resources. The sending of the single API call can be performed in the background.

In yet another general aspect, a system can include a computing device including a client application programming interface (API) call queue and a client batch API manager, and a main server including a return call queue and a server batch API manager. The client batch API manager can be configured to receive, from an interactive web application executing on the computing device, a plurality of API calls for information and data for including in a rendering of a web page by the interactive web application, determine, for each of the plurality of API calls, whether an API call satisfies at least one criterion, store, in the client API call queue, an API call for inclusion in a batch of API calls if the API call satisfies the at least one criterion, determine that an event has occurred in the computing device, and send, in a single batch API call, the batch of API calls stored in the client API call queue. The server batch API manager can be configured to receive the single batch API call, identify each API call included in the single batch API call, send each API call to a respective API server, receive, from each of the respective API servers and for each of the API calls, a return call including information and data responsive to the API call, store, in the return call queue, each of the return calls for inclusion in a batch of return calls, and send, to the computing device and in a single batch return call, the batch of return calls.

Example implementations may include one or more of the following features. For instance, the client batch API manager can be further configured to receive, from the main server, the single batch return call, identify each return call included in the single batch return call, and send each identified return call to the interactive web application. An identifier can be associated with each return call included in the single batch return call. The client batch API manager can be further configured to determine an association between a return call and an API call based on the identifier associated with the return call.

The details of one or more implementations are set forth in the accompanying drawings and the description below. Other features will be apparent from the description and drawings, and from the claims.

BRIEF DESCRIPTION OF THE DRAWINGS

Like reference symbols in the various drawings indicate like elements.

DETAILED DESCRIPTION

Figure 1A:
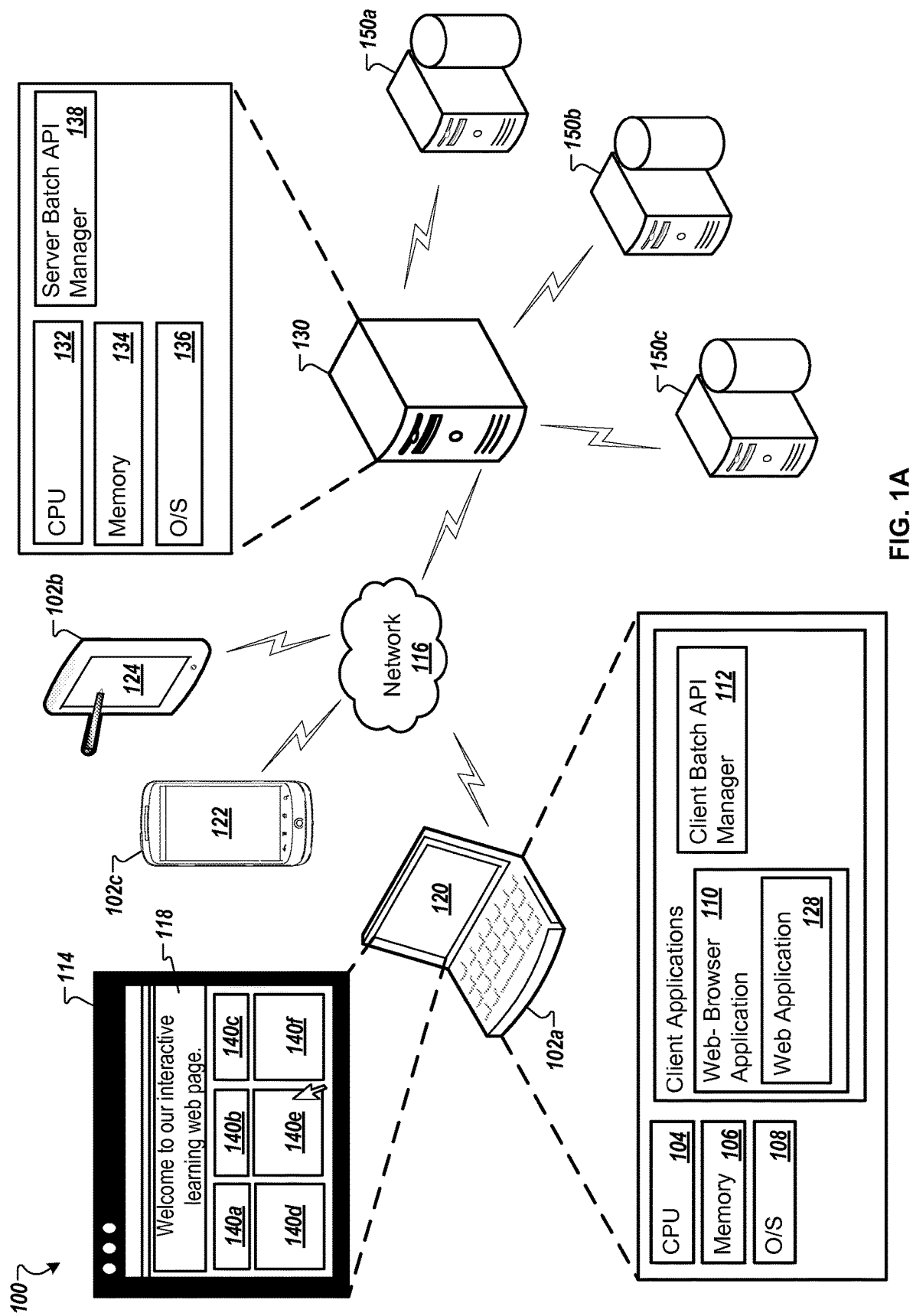
FIG. 1A is a diagram of an example system that can be used to batch API calls.

An interactive web application can be executed in a web browser application on a client computing device. The interactive web application can display a web page on a display device included in the computing device. The client computing device can be in communication with a server computing device (a main server). For example, the client computing device and the main server can be connected by way of a network. In order to display the web page, the interactive web application may first receive a skeleton for the web page from the main server. The interactive web application may then make requests to the main server to obtain other information and data to complete the rendering of the web page. In some cases, the other information and data may be user specific. In addition, a user can interact with the web page by entering information and data, requesting information and data, selecting information and data, and receiving information and data. For example, a user may be interacting with a web-based course, watching streaming video content, asking questions, and receiving answers while interacting with the web application.

The interactive web application can make an application programming interface (API) call to the main server in order to provide and/or obtain the information and data. The web application makes an API call for each information and data request. The interactive web application can use certain techniques that allow the web application to send information and data to, and to receive information and data from, the main server asynchronously (in the background) without interfering with the appearance and behavior of the displayed web page in order to render the web page.

For example, the certain techniques can involve the use of a group of interrelated Web development techniques know as asynchronous JavaScript and Extensible Markup Language (XML) (AJAX). The web application can use these techniques to make an API call to the main server for each user interaction or request. The main server can be a computing device remote from the client computing device that can communicate with the client computing device over a network. Each API call to the main server has to make a connection (a round-trip connection) to the server to send the request and subsequently receive the response. Each main server connection includes Transmission Control Protocol (TCP) and Secure Sockets Layer (SSL) roundtrips. A user interacting with the interactive web application may experience speed slowdowns or sluggish behavior of the web page because the interactions can result in multiple asynchronous API calls to the main server in order to provide and/or receive the requested information and data. The multiple asynchronous API calls to the main server result in multiple round-trip connections to the main server.

In some implementations, the client computing device can queue the API calls. The queued API calls can be included in a single batch request. The client computing device can send the single batch request to the main server. For example, instead of sending ten API calls to the main server where each API call involves the connection overhead between the client computing device and the main server (e.g., a round-trip connection), the client computing device can send a single batch of API calls to the main server. The single batch of API calls uses a single connection (a single round-trip connection) between the client computing device and the main server, reducing the connection overhead and improving the behavior of the web page by reducing or, in some cases, totally eliminating any slowdowns or sluggish behavior of the web page.

A software developer when writing the code for the interactive web application, however, would prefer not to manage the cognitive load of trying to figure out which API calls can be batched and how to batch the API calls. In addition or in the alternative, if the software developer is responsible for implementing code to create the batch API calls, legacy code that does not include this additional feature cannot take advantage of batching API calls.

An automated batching solution can include a client batch API manager in the client computing device and a server batch API manager in the server. The client batch API manager can generate and attach a batching module to each web page document for each web page rendered on the client computing device. The client batch API manager and the batching module can manage the batching of multiple asynchronous API calls from the web page, putting a group of API calls into a single batch API call. The batching module can be transparent to the web application (can be in the operating in the background without the web application having any knowledge of (or needing to have any knowledge of) its operation), dynamically batching API calls by intercepting each API call before the web application sends the API call to the server. The server batch API module can interpret the received batch API call, send each individual API call in the batch API call to the appropriate API server that is in communication with the main server, receive the information and data back from each API server responsive to the respective API call, and form a return batch API call that the main server can send to the client computing device.

FIG. 1A is a diagram of an example system 100 that can be used to batch API calls. The example system 100 includes a plurality of computing devices 102a-c (e.g., a laptop or notebook computer, a tablet computer, and a smart phone, respectively). An example computing device 102a (e.g., a laptop or notebook computer) can include one or more processors (e.g., a client central processing unit (CPU) 104) and one or more memory devices (e.g., a client memory 106). The computing device 102a can execute a client operating system (O/S) 108 and one or more client applications, such as a web browser application 110 and a client batch API manager application (e.g., a client batch API manager 112). In some implementations, as shown in the example system 100, the client batch API manager 112 can be an application included with other client applications that the computing device 102a can execute. In some implementations, the client batch API manager 112 can be included in (be part of) the web application 128.

The web browser application 110 can display a user interface (UI) (e.g., a web browser UI 114) on a display device 120 included in the computing device 102a. Though not shown in FIG. 1A, the computing devices can also include a desktop computing device.

The system 100 includes a main computer device (e.g., a main server 130). The main server 130 can include one or more processors (e.g., a server CPU 132), and one or more memory devices (e.g., a server memory 134). The computing devices 102a-c can communicate with the main server 130 (and the main server 130 can communicate with the computing devices 102a-c) using a network 116. The main server 130 can execute a server O/S 136. The main server 130 can include a server batch API manager application (e.g., a server batch API manager 138) that can receive batch API calls from the computing device 102a.

In some implementations, the computing devices 102a-c can be laptop or desktop computers, smartphones, personal digital assistants, tablet computers, or other appropriate computing devices that can communicate, using the network 116, with other computing devices or computer systems. In some implementations, the computing devices 102a-c can perform client-side operations, as discussed in further detail herein. Implementations and functions of the system 100 described herein with reference to computing device 102a, may also be applied to computing device 102b and computing device 102c and other computing devices not shown in FIG. 1A that may also be included in the system 100. The computing device 102b includes a display area 124. The computing device 102c includes a display area 122.

In some implementations, the main server 130 can represent more than one computing device working together to perform server-side operations. In this example, a single proprietor can provide the multiple servers. In some cases, the one or more of the multiple servers can provide other functionalities for the proprietor In some implementations, the network 116 can be a public communications network (e.g., the Internet, cellular data network, dialup modems over a telephone network) or a private communications network (e.g., private LAN, leased lines). In some implementations, the computing devices 102a-c can communicate with the network 116 using one or more high-speed wired and/or wireless communications protocols (e.g., 802.11 variations, WiFi, Bluetooth, Transmission Control Protocol/Internet Protocol (TCP/IP), Ethernet, IEEE 802.3, etc.).

In some implementations, the web browser application 110 can execute or interpret a web application 128 (e.g., a browser-based application). The web browser application 110 can include a dedicated user interface (e.g., the web browser UI 114). The web application 128 can include code written in a scripting language, such as AJAX, JavaScript, VBScript, ActionScript, or other scripting languages. The web application 128 can display a web page 118 in the web browser UI 114. The web page can include one or more areas of static information (e.g., text, images, etc.). The web page 118 can include one or more interactive areas 140a-f for selecting and/or receiving content and for entering and/or receiving information and data.

In a non-limiting example, the web page 118 can include user preferred content 140a-c, a user data entry area 140d, a user information area 140e, and a user-selectable request area 140f. The web page 118 can be constructed (created, rendered, or built) by the web application 128 starting with a skeleton of the web page 118. In some implementations, the skeleton of the web page 118 will not include any of the interactive areas 140a-f. In some implementations, the skeleton of the web page 118 will include some of the interactives areas 140a-f, but fewer than the total number of interactive areas 140a-f (e.g., less than all of the interactive areas 140a-f).

The web application 128 can complete the rendering of the web page 118 by further adding information and data into each of the interactive areas 140a-f based on one or more API calls the web application 128 makes to the main server 130. The web application 128 can make the API calls to the main server 130 in order to provide and/or obtain the information and data for each of the interactive areas 140a-f from one or more of the API servers 150a-c for inclusion in at least one of the interactive areas 140a-f.

The web application 128 can make an API call for each information and data request. For example, the web application 128 can make at least one API call associated with each of the interactive areas 140a-f when creating (assembling, building, rendering or constructing) the web page 118.

A user can interact with one or more of the interactive areas 140a-f resulting in the web application making API calls to the main server 130 requesting updated (additional or new) content and/or information and data for the interactive area 140a-f selected by the user. For example, when the user interacts with the user data entry area 140d, the web application 128 can make one or more API calls to the main server 130 that provide updated information and data and/or updated additional information and data requests based on the user interactions to one or more of the API servers 150a-c. In response, one or more of the API servers 150a-c may receive the updated information and data and/or receive the updated additional information and data requests. In response, each of the API servers can provide updated and/or additional information and data to the main server 130 to send to the computing device 102a in a return batch API call.

Figure 1B:
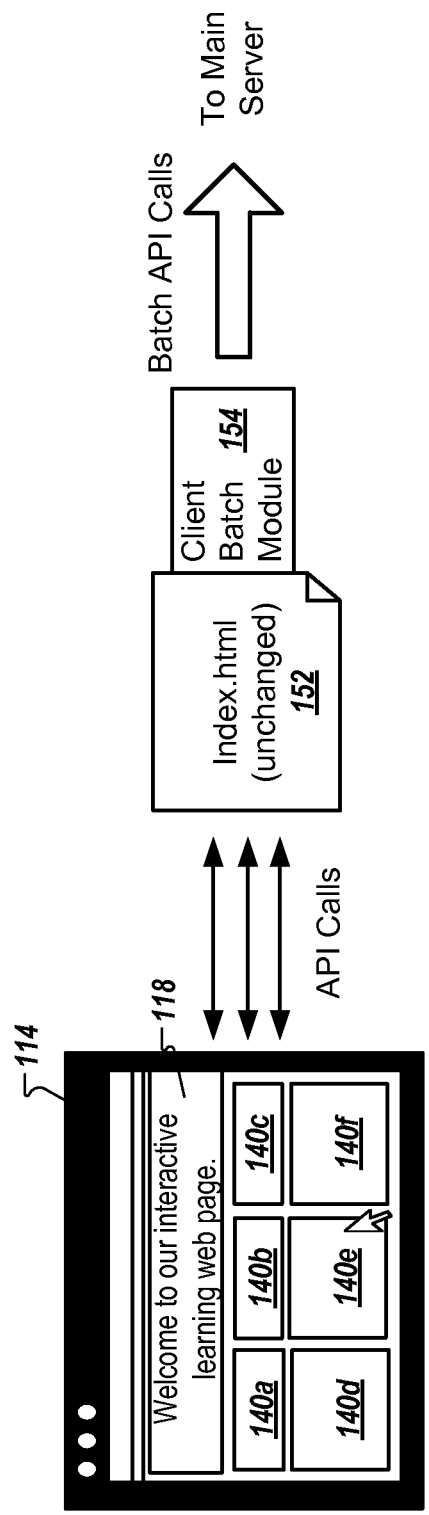
FIG. 1B is a diagram showing a web page document with an attached client batch module.

FIG. 1B is a diagram showing a web page document 152 with an attached client batch module 154. Referring to FIG. 1A, the web application 128 can use the web page document 152 to generate (create or render) the web page 118. For example, the web page document 152 can be the default web page (or main web page) for a particular web site. The web application 128, using the client batch API manager 112, can automatically create the client batch module 154 to attach to (include with) the web page document 152, leaving the web page document 152 unchanged. The client batch module 154 can include API calls that the client batch API manager 112 selects for batching based on one or more criteria. In some implementations, the client batch API manager 112 may select all of the API calls made by the web application 128 when completing the rendering of the web page 118 to include in a single batch API call. In some implementations, the client batch API manager 112 may select a subset of the API calls (less than all of the API calls) made by the web application 128 when completing the rendering of the web page 118 to include in a single batch API call. In some cases, the remaining API calls not included in the batch API call may be sent to the main server 130 individually (one at a time).

The client batch API manager 112 can generate and attach a batching module (e.g., the client batch module 154) to each web page document (e.g., the web page document 152) for each web page (e.g., the web page 118) rendered on the computing device 102a by the web application 128. A software developer can write a web application (and in particular an interactive web application) that does not need to take into consideration a batching module. The software developer can write code as they would for a default browser-based mechanism implemented by a web browser application. A client batch API manager (e.g., the client batch API manager 112) included in a computing device (e.g., the computing device 102a) can override the default browser based mechanism, as described, by intercepting each API call and attaching to (including with) a web page document a client batch module, leaving the web page document 152 unchanged. The client batch API manager can perform this function in the background and in a way that is transparent to the software developer. This allows the software developer to write code that is not dependent on the use of client batch modules and that can be executed on computing devices that include web browser applications that execute default browser-based mechanisms as well as on computing devices that include web browser applications that include a client batch API manager.

Figure 2:
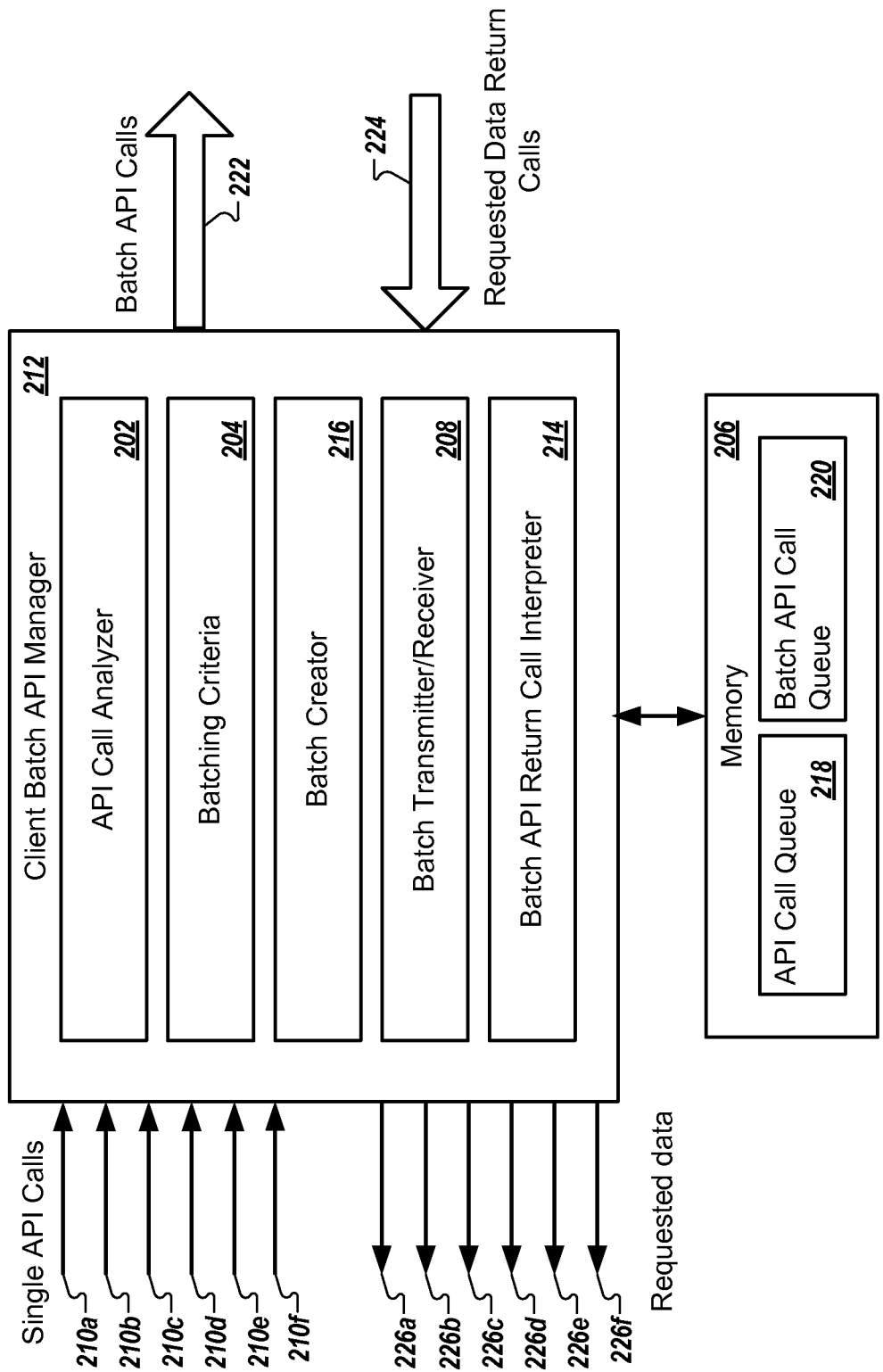
FIG. 2 is a block diagram of a client batch API manager.

FIG. 2 is a block diagram of a client batch API manager 212. For example, referring to FIG. 1A, the client batch API manager 212 can be the client batch API manager 112. The client batch API manager 212 can include an API call analyzer 202, a client batching criteria module 204, a client batch creator module 216, a client batch transmitter/receiver module 208, and a batch API return call module 214. The web application 128, when rendering the web page 118 can make multiple API calls 212a-f when creating (rendering or updating) the interactive areas 140a-f. For example, as described with reference to FIG. 1A, the web application 128 can receive a skeleton for the web page from the main server 130. The web application 128 can then further create (render or update) the interactive areas 140a-f based on information and data sent to and received from one or more API calls (e.g., API calls 210a-f). For example, an API call 210a-f can be associated with a respective interactive area 140a-f.

The API call analyzer 202 can analyzer (evaluate) each API call sent to the client batch API manager 212 to determine a size for the API call. The larger an API call, the more time it may take to be implemented. It may not be feasible (or make sense) to hold (queue) and batch very large API calls because doing so could result in noticeable slowdowns or sluggish behavior of the web page by the user.

The client batching criteria module 204 can determine if, and in some cases when, an API call can be included in a batch API call. For example, the API call analyzer 202 can analyze (evaluate) each API call 210a-f. For example, the client batching criteria module 204 can store a value for a threshold API size in memory 206. In some implementations, the memory 206 can be the memory 106 as shown in FIG. 1A. In some implementations, the memory 206 can be additional memory included in the computing device 102a. The client batching criteria module 204 can compare the size of an API call to the threshold API size. API calls that have an associated size that is equal to or less than the threshold API size can be considered for placement in a batch API call. API calls that have an associated size that is greater than the threshold API size may not be placed in a batch API call and can be handled as an individual API call.

In some implementations, if a size of an API call satisfies a threshold criterion (e.g., the size of the API call is equal to or less than the threshold API size) a flag associated with the API call is set (e.g., the flag is set equal to "1"). The set flag can indicate that the API call can be included in a batch API call. The setting of the flag associated with the API call can be referred to as flagging the API call for batching. If the size of an API call does not satisfy a threshold criterion (e.g., the size of the API call is greater than the threshold API size) a flag associated with the API call will not be set (the flag is cleared) (e.g., the flag is set equal to "0"). The un-set or cleared flag can indicate that the API call should not be included in a batch API call and should be handled as an individual API call.

The API call analyzer 202 can determine an origin of the occurrence of the API call. For example, the API call analyzer 202 can determine that API calls are for the same web page. The client batching criteria module 204 can flag the API calls for batching because the API calls are for the same web page. In another example, referring to FIG. 1A, the API call analyzer can determine that API calls occur between a two ticks (e.g., between a first tick and a second tick) of an event loop of the web application 128 executing on the computing device 102a. The client batching criteria module 204 can flag the API calls for batching because the API calls occur between the two ticks.

An API call that is flagged and considered for batching can be included in (stored in) a client API call queue 218 included in the memory 206. The client batch creator module 216 can monitor a number of API calls included in the client API call queue 218. In some implementations, when the number of API calls included in the client API call queue 218 is equal to a batch threshold value (e.g., the number of API calls in the client API call queue 218 is equal to ten), the client batch creator module 216 creates a batch API call.

The client batch API manager 212 can send the batch API call (e.g., a batch API call 222) using the client batch transmitter/receiver module 208 to the main server 130 if a round-trip batch API call process is not in progress. For example, if the client batch API manager 212 is currently in the process of sending a batch API call and/or in the process of receiving batch requested data in response to a batch API call, then if the client batch creator module 216 determines that batching criteria is met for creating a batch API call, the client batch creator module 216 can create the batch API call and can place the batch API call in a batch API call queue 220. When the round-trip process of the current batch API call is complete, the client batch API manager, using the client batch transmitter/receiver module 208, can send the next batch API call in the batch API call queue 220 to the main server 130.

In some implementations, API calls can be stored in (placed in) the client API call queue 218 in a first in, first out manner (e.g., sequentially). In some implementations, API calls can be stored in (placed in) the client API call queue 218 in order of a size associated with the API call as determined by the API call analyzer 202. For example, API calls that are smaller can be placed higher in the queue (closer to the top of the queue) making them more likely to be included in a batch API call. For example, API calls that are larger can be placed lower in the queue (closer to the bottom of the queue) making them less likely to be included in a batch API call.

In some implementations, the client batch creator module 216 can monitor a time from an occurrence of an event in the computing device 102a. For example, if a predetermined amount of time has transpired since a batch API call was sent to the main server 130, the client batch creator module 216 can create and send, or store (place) in the batch API call queue 220 a batch API call that includes the batch API calls in the client API call queue 218. In some implementations, the client batch creator module 216 can use multiple criteria to determine when to create and send a batch API call. For example, if a number of API calls in the client API call queue 218 does not reach a threshold number (e.g., ten API calls) before a predetermined amount of time from a previous occurrence of an event on the computing device 102a (e.g., from the receipt of a skeleton web page from the main server 130), the client batch creator module 216 can create and send, or store (place) in the batch API call queue 220, a batch API call that includes the API calls in the client API call queue 218.

In response to the sending of a batch API call (e.g., the batch API call 222) by the client batch transmitter/receiver module 208 to the main server 130, the client batch API manager 212 can receive one or more requested data return calls (e.g., requested data return call 224) to the client batch transmitter/receiver module 208. In some implementations, a requested data return call can be a single return call that can include a batch of the all of the requested information and data. In some implementations, more than one (two or more) requested data return calls can be responsive to the batch API call 222, each requested data return call including a subset of the requested information and data and each requested data return call including a partial batch of the all of the requested information and data. In some implementations, the requested data return calls can be separate individual return calls. As will be described more with reference to FIG. 4, the main server 130 can determine how to return the requested information and data based on at least one criterion.

The client batch API manager 212 can use the batch API return call module 214 to interpret a batch requested data return call to determine respective return calls 226a-f for each of the single API calls 210a-f. A respective return call can include content, information and/or data for input to the respective interactive area 140a-f. For example, each batch requested data return call 224 includes a unique identifier and each return call includes a unique identifier. Leveraging the use of a markup language, the batch API return call module 214 can determine that the return calls 226a-f are associated with (are for, are responsive to) the API calls 210a-f, respectively.

Figure 3:
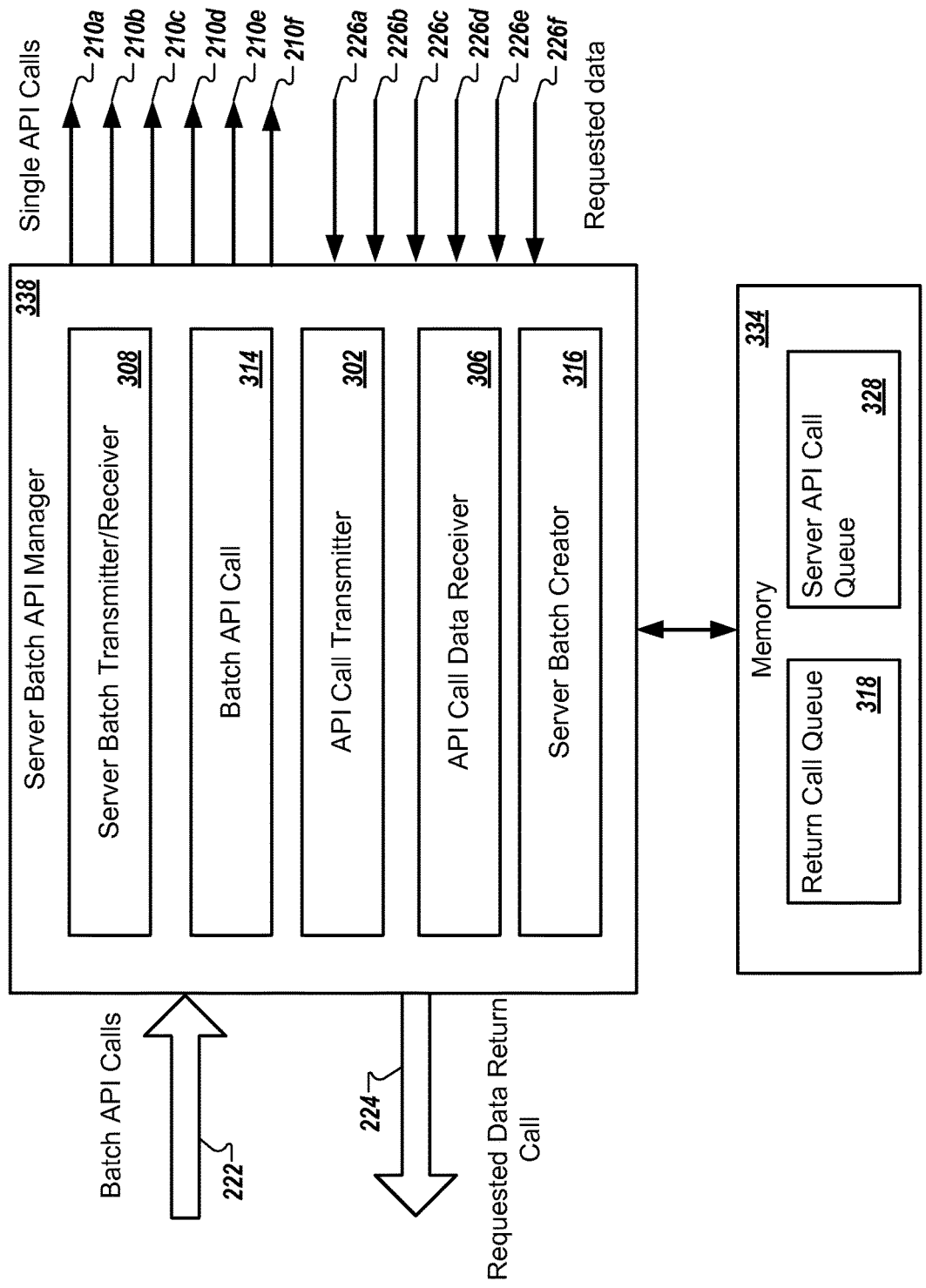
FIG. 3 is a block diagram of a server batch API manager.

FIG. 3 is a block diagram of a server batch API manager 338. For example, referring to FIG. 1A, the server batch API manager 338 can be the server batch API manager 138. The server batch API manager 338 can include an API call transmitter 302, an API call data receiver 306, a server batch creator module 316, a server batch transmitter/receiver module 308, and a batch API call module 314. Referring to FIG. 2, the client batch API manager 212 can send a batch API call 222 from a computing device (e.g., the computing device 102a) to a server (e.g., main server 130) that includes the server batch API manager 338.

The server batch API manager 338 can use the batch API call module 314 to interpret a batch API call (e.g., the batch API call 222) to determine the single API calls 210a-f. The server batch API manager 338 can store the single API calls 210a-f in a server API call queue 328 included in a server memory 334. In some implementations, the server memory 334 can be the server memory 134 as shown in FIG. 1A. In some implementations, the server memory 334 can be additional memory included in the main server 130. In some implementations, the single individual API calls included in a batch API call can be stored in (placed in) the server API call queue 328 in an order in which they occur in the batch API call.

The API call transmitter 302 can send one or more of the single API calls 210a-f to one or more API servers (e.g., the API servers 150a-c as shown in FIG. 1A). The API call transmitter 302 can send (transmit) each API call to each API server in parallel. In some cases, the API call transmitter 302 may send more than one (two or more) of the API calls 210a-f to the same API server. In these cases, the API call transmitter 302 can send the API calls to the same API server sequentially, buffering the sequential calls in the server API call queue 328.

The API call data receiver 306 receives the respective return calls 226a-f for each of the single API calls 210a-f. A respective return call can include content, information and/or data for input to the respective interactive area 140a-f as shown in FIG. 1A. The return calls 226a-f can be stored in a return call queue 318 included in the server memory 334. In some implementations, the API call data receiver 306 can store the return calls 226a-f in a first in, first out manner (e.g., sequentially) in an order in which a return call is received by the API call data receiver 306. In some cases, therefore, the return calls 226a-f may be stored in the return call queue 318 in an order different from the order of the respective API calls 210a-f in the batch API call 222. This can occur because the execution time of each API call can be different and the API calls 210a-f may not be included in an order in the batch API call 222 based on their respective execution times. For example, the API calls 210a-f may be included in the batch API call 222 in an order in which they were received by the client batch API manager 212. Each of the API calls 210a-f can include a unique identifier and each of the return calls 226a-f can include a unique identifier. Leveraging the use of a markup language, the return calls 226a-f that are associated with (are for, are responsive to) the API calls 210a-f, respectively, can be determined.

The server batch creator module 316 can create a batch requested data return call that includes the return calls 226a-f for each of the single API calls 210a-f. In some implementations, the server batch creator module 316 can create a single batch requested data return call (e.g., requested data return call 224) that includes the return calls 226a-f for each of the single API calls 210a-f. In these implementations, the server batch transmitter/receiver module 308 will not transmit the requested data return call 224 to the client batch API manager 212 until all of the API calls 210a-f have been completed. In some cases, this may result in noticeable slowdowns or sluggish behavior of the web page by the user because it may delay information and data needed by the web page.

The server batch creator module 316 may use additional criteria when creating requested data return calls. In some implementations, the server batch creator module 316 may create multiple batch requested data return calls. For example, the server batch creator module 316 may create a batch requested data return call when a predetermined amount of time has transpired since the server batch API manager 338 received the batch API call 222. At this time, in some cases, the API call data receiver 306 may not have received all of the return calls 226a-f. The server batch creator module 316 can create a batch requested data return call that includes the return calls included in the return call queue 318 at the time of creation of the batch file. The server batch creator module 316 can create additional batch requested data return calls periodically as determined by a predetermined time period (e.g., every ten milliseconds) until all of the return calls are transmitted to the client batch API manager 212. In another example, the server batch creator module 316 can monitor a number of return calls included in the return call queue 318. When the number of return calls included in the return call queue 318 is equal to a threshold value (e.g., the number of return calls in the return call queue 318 is equal to ten), the server batch creator module 316 creates a batch requested data return call.

In some implementations, the server batch creator module 316 can use multiple criteria to determine when to create a batch requested data return call. For example, when creating multiple requested data return calls, the server batch creator module 316 may not create another batch requested data return call until a previous batch requested data return call has been successfully transmitted to and received by the client batch API manager 212.

In some implementations, the server batch creator module 316 may not create any batch requested data return calls. In these implementations, in some cases, the server batch API manager 338 (and specifically the server batch transmitter/receiver 308) can transmit the return calls 226a-f individually as received from the API servers. In other cases, the API call data receiver 306 store a return call in the return call queue when it is received and the server batch transmitter/receiver 308 can transmit the each return call from the queue in the order in which it was placed in the queue.

Figure 4:
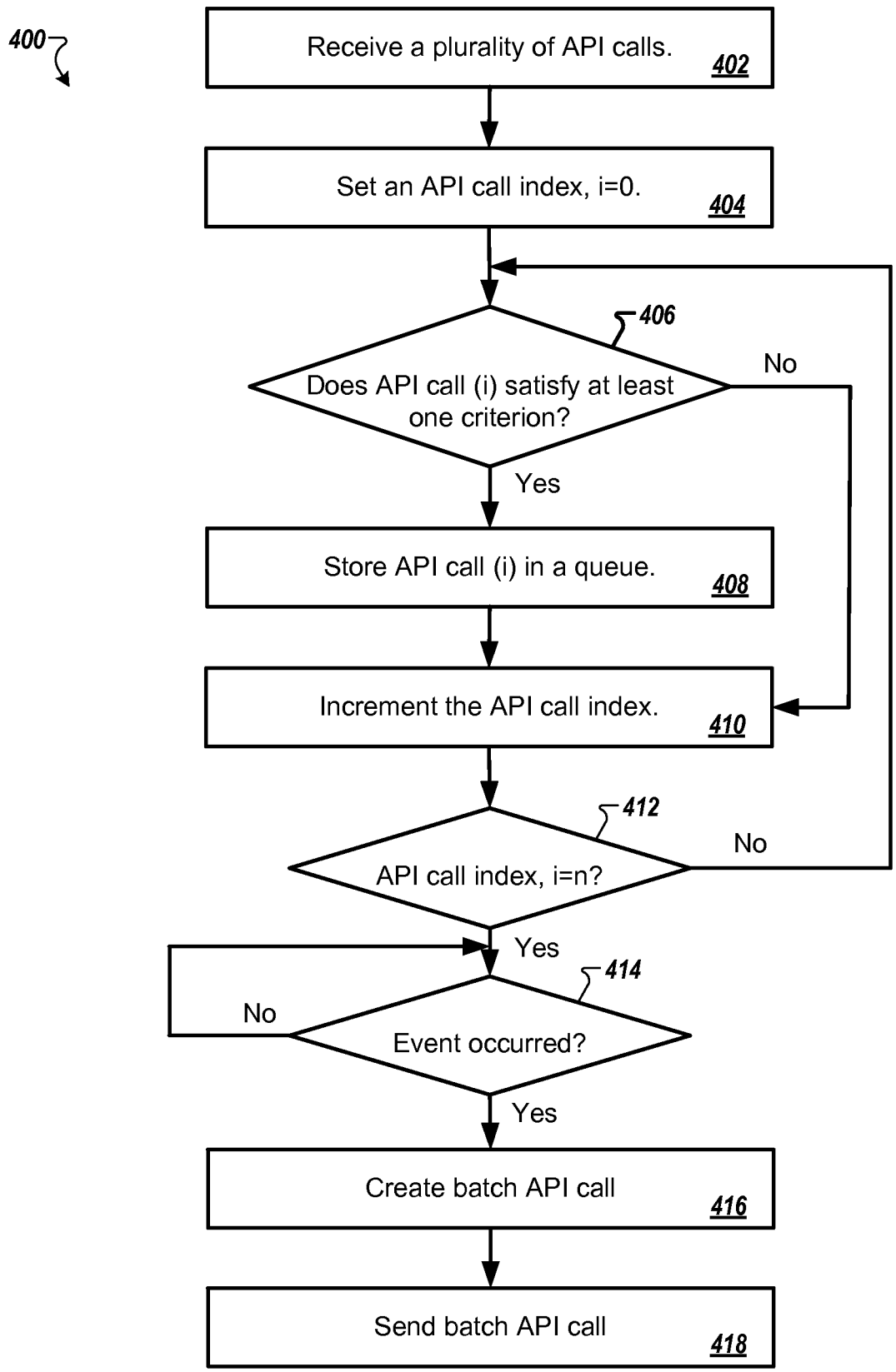
FIG. 4 is a flowchart that illustrates a method for rendering a web page.

FIG. 4 is a flowchart that illustrates a method for rendering a web page. In some implementations, the systems described herein can implement the method 400. For example, the method 400 can be described referring to FIGS. 1A-B, 2 and 3.

A plurality of API calls for information and data for including in the rendering of a web page by an interactive web application is received (block 402). For example, the referring to FIG. 2, the client batch API manager 212 can receive single API calls 210a-f. An API call index is set equal to zero (block 404). It is determined whether an API call satisfies at least one criterion (block 406). If the API call satisfies at least one criterion, the API call is stored in a queue (block 408). For example, referring to FIG. 2, the API call analyzer 202 can analyze (evaluate) the API call. For example, if the API call satisfies a criterion (e.g., the size of the API call is equal to or less than the threshold API size, the API call is for the same web page as a previous API call, the API call occurs within two ticks of an event loop), the API call is stored in a queue (block 408). If the API call does not satisfy at least one criterion (block 406), the API call is not stored in a queue. The API call index is incremented (block 410). If the API call index is not equal to n (the total number of API calls for processing) (block 412), the method 400 continues to check the API calls in block 406. It is determined whether an event has occurred (block 414). If an event has not occurred (block 414), continue to wait for an event to occur. If an event has occurred, a batch API call is created (block 416). The batch API call is sent (block 418).

For example, referring to FIGS. 1A-B, and 2, an event can be that a predetermined amount of time has transpired since a batch API call was sent to the main server 130. In this case, the client batch creator module 216 can create and send, or store (place) in the batch API call queue 220 a batch API call that includes the batch API calls in the API call queue. In an example use of multiple criteria, an event can be that a number of API calls in the API call queue 218 does not reach a threshold number before a predetermined amount of time. The client batch creator module 216, therefore, can create and send, or store (place) in the batch API call queue 220, a batch API call that includes the batch API calls that are included in the API call queue.

Figure 5:
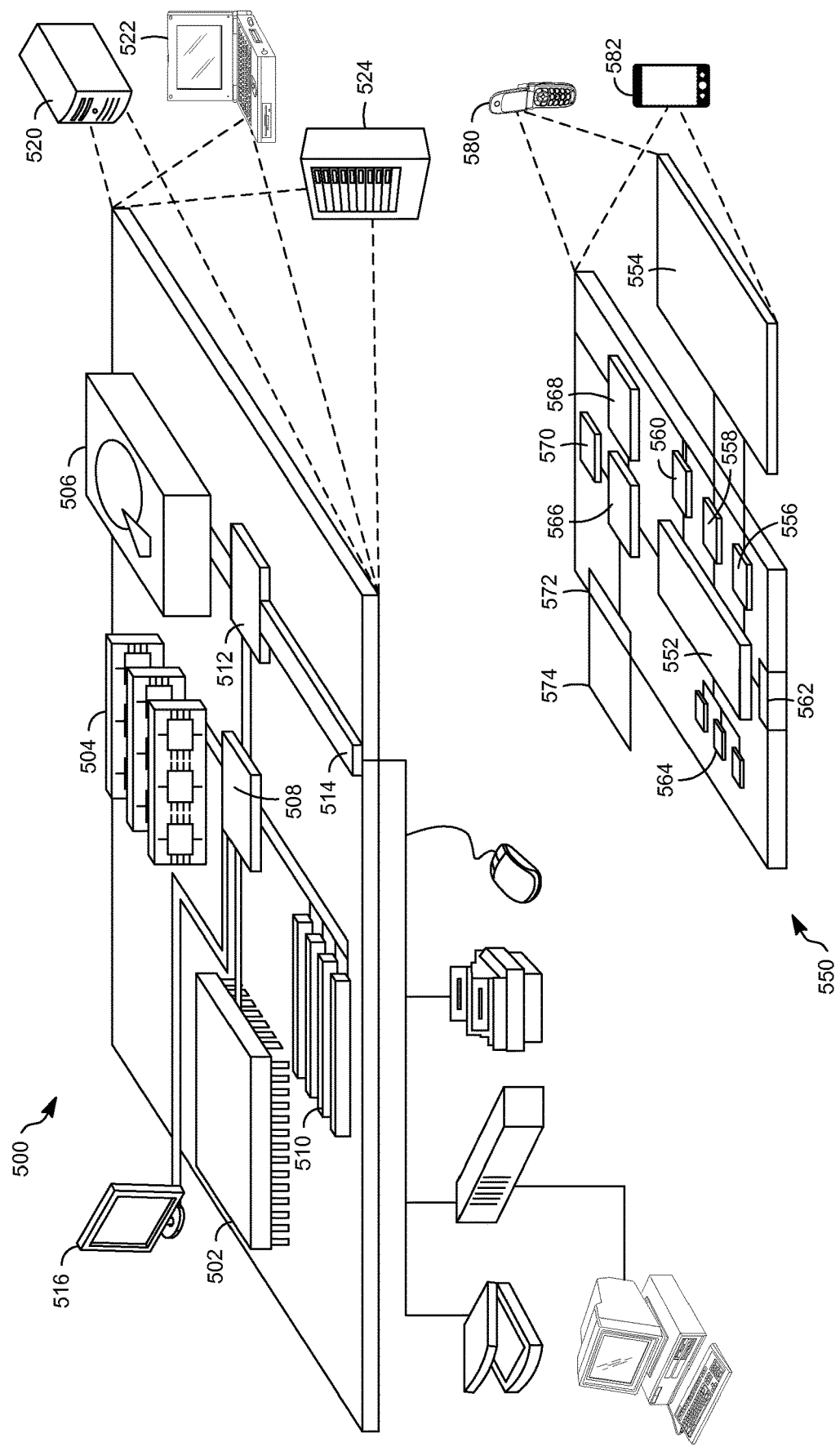
FIG. 5 shows an example of a computer device and a mobile computer device that can be used to implement the techniques described here.

FIG. 5 shows an example of a generic computer device 500 and a generic mobile computer device 550, which may be used with the techniques described here. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD (Thin-Film-Transistor Liquid Crystal Display) or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552, that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smart phone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A method for rendering a web page, the method comprising:
    receiving, from an interactive web application executing on a computing device, a plurality of application programming interface (API) calls for information for including in the rendering of the web page by the interactive web application, each API call being associated with a respective flag;
    determining, for each of the plurality of API calls, whether a respective flag for the API call is set;
    comparing the size of each API call to a threshold API size to determine which API calls have an associated size that is equal to or less than the threshold API size and which API calls have an associated size that is greater than the threshold API size;
    storing, in a client API call queue included on the computing device, API calls that have associated sizes that are equal to or less than the threshold API size for inclusion in a batch of API calls if the respective flags for the API calls are set;
    monitoring a number of API calls included in the client API call queue;
    when the number of API calls included in the client API call queue reaches a batch threshold value, creating a single batch API call including the API calls in the client API call queue having their respective flags set;
    sending the single batch API call, the sending based on an occurrence of an event in the computing device; and
    handling the API calls that have associated sizes that are greater than the threshold API size as individual API calls.

2. The method of claim 1, further comprising:
    receiving a skeleton of the web page before receiving the API call.

3. The method of claim 1, wherein the at least one criterion for a characteristic associated with the API call is that the API call occurs between a first tick and a second tick of an event loop executing on the computing device.

4. The method of claim 3, wherein the event is the second tick of the event loop.

5. The method of claim 1, wherein the event is the determining that a number of API calls stored in the memory equals a threshold number of API calls.

6. The method of claim 1, wherein the at least one criterion for a characteristic associated with the API call is that the API call is performed within a predefined amount of time.

7. The method of claim 1, wherein the at least one criterion for a characteristic associated with the API call is that the API call uses less than a predetermined number of resources.

8. The method of claim 1, wherein the sending of the single API call is performed in the background.

9. A non-transitory, machine-readable medium having instructions stored thereon, the instructions, when executed by a processor, cause a computing device to:
    receive, from an interactive web application executing on a computing device, a plurality of application programming interface (API) calls for information for including in a rendering of a web page by the interactive web application, each API call being associated with a respective flag;
    determine, for each of the plurality of API calls, whether a respective flag for the API call is set;
    compare a size of each API call to a threshold API size to determine which API calls have an associated size that is equal to or less than the threshold API size and which API calls that have an associated size that is greater than the threshold API size;
    store, in a client API call queue included on the computing device, the API calls that have an associated size that is equal to or less than the threshold API size for inclusion in a batch of API calls if the respective flags for the API calls are set;
    monitor a number of API calls included in the client API call queue;
    when the number of API calls included in the client API call queue reaches a batch threshold value, create a single batch API call including the API calls in the client API call queue having their respective flags set;
    send the single batch API call, the sending based on an occurrence of an event in the computing device; and
    handling the API calls that have an associated size that is greater than the threshold API size as individual API calls.

10. The medium of claim 9, the instructions causing the computing device to:
    receive a skeleton of the web page before receiving the API call.

11. The medium of claim 9, wherein the at least one criterion for a characteristic associated with the API call is that the API call occurs between a first tick and a second tick of an event loop executing on the computing device.

12. The medium of claim 11, wherein the event is the second tick of the event loop.

13. The medium of claim 9, wherein the event is determining that a number of API calls stored in the memory equals a threshold number of API calls.

14. The medium of claim 9, wherein the at least one criterion for a characteristic associated with the API call is that the API call is performed within a predefined amount of time.

15. The medium of claim 9, wherein the at least one criterion for a characteristic associated with the API call is that the API call uses less than a predetermined number of resources.

16. The medium of claim 9, wherein the sending of the single API call is performed in the background.

17. A system comprising:
a computing device including a client application programming interface (API) call queue and a client batch API manager; and
a main server including a return call queue and a server batch API manager,
wherein the client batch API manager is configured to:
receive, from an interactive web application executing on the computing device, a plurality of API calls for information for including in a rendering of a web page by the interactive web application, each API call being associated with a respective flag;
determine, for each of the plurality of API calls, whether a respective flag for the API call is set;
comparing the size of each API call to a threshold API size to determine which API calls have an associated size that is equal to or less than the threshold API size and which API calls have an associated size that is greater than the threshold API size;
store, in the client API call queue, API calls that have associated sizes that are equal to or less than the threshold API size for inclusion in a batch of API calls if respective flags for the API calls are set;
monitor a number of API calls included in the client API call queue;
when the number of API calls included in the client API call queue reaches a batch threshold value, create a single batch API call including the API calls in the client API call queue having their respective flags set;
determine that an event has occurred in the computing device;
in response to the event, send the single batch API call, wherein the server batch API manager is configured to:
receive the single batch API call;
identify each API call included in the single batch API call;
send each API call to a respective API server;
receive, from each of the respective API servers and for each of the API calls, a return call including information responsive to the API call;
store, in the return call queue, each of the return calls for inclusion in a single batch of return calls; and
send, to the computing device the single batch return call; and
handle the API calls that have an associated size that is greater than the threshold API size as individual API calls.

18. The system of claim 17, wherein the client batch API manager is further configured to:
receive, from the main server, the single batch return call;
identify each return call included in the single batch return call; and
send each identified return call to the interactive web application, wherein an identifier is associated with each return call included in the single batch return call, and wherein the client batch API manager is further configured to determine an association between a return call and an API call based on the identifier associated with the return call.

19. The system of claim 17, wherein the computing device is configured to receive a skeleton of the web page before the client batch API manager receives the API call.

20. The system of claim 17,
wherein the at least one criterion for a characteristic associated with the API call is that the API call occurs between a first tick and a second tick of an event loop executing on the computing device, and
wherein the event is the second tick of the event loop.

* * * * *